(12) United States Patent
Xie et al.

(10) Patent No.: US 10,151,017 B2
(45) Date of Patent: Dec. 11, 2018

(54) METHOD FOR EXTRACTING ULTRA HIGH PURITY ALUMINA FROM WASTERWATER

(71) Applicant: Yadian Xie, Painted Post, NY (US)

(72) Inventors: Yadian Xie, Painted Post, NY (US); Duygu Kocaefe, Chicoutimi (CA); Wei Liu, Guiyang (CN); Shuai Zhang, Shenzhen (CN); Yuanyuan Sun, Shenzhen (CN)

(73) Assignee: Yadian Xie, Painted Post, NY (US)

( * ) Notice: Subject to any disclaimer, the term of this patent is extended or adjusted under 35 U.S.C. 154(b) by 275 days.

(21) Appl. No.: 15/136,931

(22) Filed: Apr. 24, 2016

(65) Prior Publication Data

US 2017/0306443 A1    Oct. 26, 2017

(51) Int. Cl.
*C22B 3/26*    (2006.01)
*C02F 1/00*    (2006.01)
*C22B 21/00*   (2006.01)
*C22B 3/42*    (2006.01)
*C22B 3/44*    (2006.01)
*C22B 59/00*   (2006.01)

(52) U.S. Cl.
CPC ............ *C22B 21/0023* (2013.01); *C02F 1/00* (2013.01); *C22B 3/0005* (2013.01); *C22B 3/42* (2013.01); *C22B 3/44* (2013.01); *C22B 59/00* (2013.01)

(58) Field of Classification Search
None
See application file for complete search history.

(56) References Cited

FOREIGN PATENT DOCUMENTS

WO    WO-2011127671 A1 * 10/2011 ................ C01F 7/06
WO    WO-2014047728 A1 *  4/2014 ........... C01B 7/0706

* cited by examiner

*Primary Examiner* — Melissa S Swain
(74) *Attorney, Agent, or Firm* — Wayne & Ken, LLC; Tony Hom (57) ABSTRACT

An object of the present invention is to provide a novel method for extracting ultra high purity alumina from wastewater. Wastewater is recycled, filtered, concentrated and pretreated in order to mix with alkali solution and extraction agent PX-17, undergoing 2 times of purification, adding control agent SX-1 and high temperature heat treatment to finally obtain ultra high purity nano-alumina particles which purity reaches as 99.999% and particle size reaches as 20~200 nm.

10 Claims, 8 Drawing Sheets

| sample | purity (%) | Trace element residual (ppm) | | | | | | | | | | | | | | |
|---|---|---|---|---|---|---|---|---|---|---|---|---|---|---|---|---|
| | | Ca | Fe | Si | Na | K | Mg | Ni | Pb | Ti | Cr | V | Zn | Cd | Y | Ce |
| $Al_2O_3$ | 99.992 | 11 | 20 | 9 | 12 | 8 | 5 | 5 | 3 | - | - | - | 6 | - | - | - |

Fig.4

| sample | purity (%) | Trace element residual (ppm) | | | | | | | | | | | | | |
|---|---|---|---|---|---|---|---|---|---|---|---|---|---|---|---|
| | | Ca | Fe | Si | Na | K | Mg | Ni | Pb | Ti | Cr | V | Zn | Cd | Y | Ce |
| $Al_2O_3$ | 99.995 | 8 | 12 | 7 | 10 | 6 | 2 | 3 | 2 | - | - | - | 3 | - | - | - |

Fig.5

| sample | purity (%) | Trace element residual (ppm) | | | | | | | | | | | | | |
|---|---|---|---|---|---|---|---|---|---|---|---|---|---|---|---|
| | | Ca | Fe | Si | Na | K | Mg | Ni | Pb | Ti | Cr | V | Zn | Cd | Y | Ce |
| $Al_2O_3$ | 99.994 | 6 | 15 | 7 | 9 | 10 | 3 | 4 | 2 | - | - | - | 2 | - | - | - |

Fig.6

| sample | purity (%) | Trace element residual (ppm) | | | | | | | | | | | | | |
|---|---|---|---|---|---|---|---|---|---|---|---|---|---|---|---|
| | | Ca | Fe | Si | Na | K | Mg | Ni | Pb | Ti | Cr | V | Zn | Cd | Y | Ce |
| $Al_2O_3$ | 99.995 | 6 | 11 | 4 | 9 | 7 | 5 | 1 | 1 | - | - | - | 3 | - | - | - |

Fig.7

| sample | purity (%) | Trace element residual (ppm) | | | | | | | | | | | | | |
|---|---|---|---|---|---|---|---|---|---|---|---|---|---|---|---|
| | | Ca | Fe | Si | Na | K | Mg | Ni | Pb | Ti | Cr | V | Zn | Cd | Y | Ce |
| $Al_2O_3$ | 99.999 | 2 | <1 | 2 | 3 | 1 | - | - | - | - | - | - | - | - | - | - |

Fig.8

METHOD FOR EXTRACTING ULTRA HIGH PURITY ALUMINA FROM WASTEWATER

TECHNICAL FIELD

The present invention belongs to the field of waste recycling and chemical process, more particularly, to a novel method for extracting ultra high purity nano-alumina from wastewater.

BACKGROUND

Aluminum ($Al^{3+}$) wastewater mainly includes all kinds of Aluminum surface treatment liquid which strictly prohibited to emission directly due to its strong acid.

Most of factories and enterprises are mostly used to add water to dilute or alkali neutralization. This extensive processing method, not only cause a part of the aluminum ions being discharge directly, but also a large number of harmful petal ions and heavy metal ions is discharged directly. In this way, a large amount of water and alkali can be consumed, at the same time, surface water, groundwater and ground field is possible to be polluted by a large volume of wastewater.

Shi reports his research results that proposed to extract aluminum ion ($Al^{3+}$) from aluminum foil treatment wastewater to prepare polyaluminum chloride (Poly-Aluminum Chloride, PAC), the final utilization of other wastewater as flocculants. However, he couldn't dodge a central question indeed in the aluminum ($Al^{3+}$) wastewater often content a certain amount of other metal cations such as calcium, iron, copper, sodium or even, heavy metal cations. These impurities continue to exist in the flocculant while water purification, this may cause secondary pollution.

In recent years, there are gradually development of aluminum ($Al^{3+}$) waste water which reused for making some industrial products, such as aluminum sulfate, aluminum carbonate, polymeric ferric aluminum chloride, intends to achieve wastewater resourceful recycling. But lack of these methods obvious those products that reused from waste water are mostly low quality, low value-added products. Indeed, these products are very difficult to gain enough revenue to support cost of wastewater resourceful recycling, this wouldn't make the recycling of wastewater effectively and stably.

Some researchers have proposed to treat waste water by using ion exchange method, such as the use of ion exchange resin for recovery of aluminium ($Al^{3+}$) ion. This method not only due to the ion exchange resin itself has the preferential adsorption of different ions, lead to filter only partially ions, not to completely purify wastewater. Especially, the long time adsorption, non-stable adsorption amount, and the costly of ion exchange resin increase the economic burden of factories and enterprises.

Ultra high purity nano alumina has the advantages of high density, high melting point, high hardness and good chemical stability, it is widely used on a variety of optical devices, window materials sapphire substrate materials in emerging high-tech industries, but alumina powder conventionally produced from bauxite ore by Bayer process, this production process simple, extensive and large energy consumption and can only produce the purity of the alumina at around 98%-99%, coarse particles is mostly in bigger than 10 µm and particle size distribution is not uniform, so the Bayer products are mainly provide for aluminum reduction process. Base on Bayer process, many methods have emerged such as aluminum ammonium sulfate, aluminium alkoxide method, flame sintering in high temperature method and so on, all these methods have a big cost on their raw materials, such as aluminum sulfate ammonium method using high purity aluminium hydroxide, aluminium alkoxide method using the high purity aluminum block, high temperature sintering method using high purity aluminum powder. At the same time, large amount of harmful gases volatile such as nitrogen oxides, sulfur monoxide, sulfur dioxide, hydrogen sulfide and isopropanol in the heat treatment process. These methods generally have the high cost of raw materials, big pollution of the production process, alumina particle size hard to control.

SUMMARY OF THE INVENTION

Target on the shortcomings in the existing methods, combined with the guiding ideas of resourceful recycling, this invention aims to provide a novel method for extracting ultra high purity nano-alumina from wastewater, finally obtain the purity of 99.999%, particle size in 20~200 nm of a high purity nano-alumina.

To achieve the above object, the present invention provides a novel method for extracting ultra high purity nano-alumina from wastewater, comprising the steps of Step 1, filter the raw material waste containing aluminum ($Al^{3+}$) by Teflon mesh, and concentrate it to maintain aluminum ions ($Al^{3+}$) mass fraction of 3%~8%; Then, the concentrated solution is dropped into the alkaline solution while the alkali mass fraction reaches 10%~60%.

Step 2, add extraction agent PX-17 into mixed solution and stir, during extraction process keep the pH value always at 1-9, maintain the temperature at 10° C.~90° C.; add extraction agent PX-17 in the preliminary extraction for a secondary extraction, the initial dosage is 1~5 g/L, and stirring time is 30 min~5 h in the preliminary extraction; the second dosage is 0.1~3 µg/L, and stirring time is 0.5 h~5 h in the secondary extraction.

Step 3, add the control agent SX-1 into above extract solution and stir, dosage is 0.1~5 g/L, stir for 1 h~24 h at 20° C.~280° C.; and add the alkali solution under the pH value as 1 to 10 to precipitate the aluminum hydroxide; then cooling, filtering and washing with ultra-pure water for 3~5 times, drying under 80° C.~120° C. to obtain pure a u hydroxide precursor.

Step 4, heat the pure aluminum hydroxide precursor under 600° C.~1200° C. for 0.5~4 hours; then obtain the ultra high purity nano alumina by cooling down under a certain temperature.

Wherein the waste water in step (1) contains the surface treatment waste liquid of various aluminum, aluminum plate, aluminum wire, aluminum foil, aluminum brick and aluminum alloy.

Wherein the alkaline solution in step 1 includes one or more of sodium hydroxide solution, potassium hydroxide solution, carbonate soda solution, potassium carbonate solution, calcium hydroxide solution and aqueous ammonia.

Wherein the alkaline solution in step 3 includes one or ore of sodium hydroxide solution, potassium hydroxide solution carbonate soda solution, potassium carbonate solution, calcium hydroxide solution and aqueous ammonia.

Wherein the main components of contraction agent PX-17 in step 2 are giant porous ion exchange resin, macroporous zeolite molecular sieve, activated carbon, porous carbon fiber, urea, porous alumina, the PX-17 component content is as follow: giant porous ion exchange resins 18.5%~22%, macroporous zeolite molecular sieve 10.5%~14%, activated carbon 3.5%~7%, porous activated carbon fibers 26.5%~31%, urea 14%~17%, and porous alumina 22.5% to 27%.

Further, the PX-17 component content is as follows: giant porous ion exchange resins 19.0%~20%, macroporous zeolite molecular sieve 10.8%~12.5% activated carbon 3.8%~5.5%, porous activated carbon fibers 27%~28.5%, urea 14.5%~16%, and porous alumina 23% to 24.5%.

Preferably, the PX-17 component content is as follows: giant porous ion exchange resins 19.5%, macroporous zeolite molecular sieve 11%, activated carbon 4%, porous activated carbon fibers 27.5%, urea 14.8%, and porous alumina 23.2%.

Wherein main components of contraction agent SX-1 in step 3 includes one or more mixed solution of polyvinyl pyrrolidone, polyethylene glycol-2000, gelatin, polyoxyethylene polyoxypropylene copolymers, Tween, polyvinyl-124, and aluminum hydroxide Wherein the ultra high purity nano-alumina in step 4 is taken out and pass through a fast cooling tunnel at a temperature of 0° C.~4° C. for 15 min~90 min.

The advantages of the invention are as follows:

1. Efficient extraction aluminum ($Al^{3+}$) ion of wastewater, 99.99% aluminum ion ($Al^{3+}$) can be extracted from wastewater; separation removal of other metal ions, removal rate reached 99.99%; producing ultra high purity nano-alumina ($Al_2O_3$) and reach the purity of 5N, homogeneous morphology, particle size in 20 nm~200 nm; application on the field of civilian industry, aerospace, military industry, traffic information, energy and environment.

2. Compared with currently recycling aluminum ($Al^{3+}$) wastewater and high purity alumina powder production process, this novel method is simple and effective, no pollution in production process, easy to control, no harmful gases and wastes residual in the environment; because the raw material is from the wastewater recycling, this method can further low down the product cost for 30% to 50% compare to other conventional production process, obtain enormous economic and social benefits. Directly applied in the preparation of a variety of optical devices, window materials, LED sapphire substrate, etc.

BRIEF DESCRIPTION OF THE INVENTION

The embodiments of the present invention can be better understood by reference to the following examples which are offered by way of illustration. The present invention is not limited to the example given herein.

EXAMPLE 1

Figure 1:
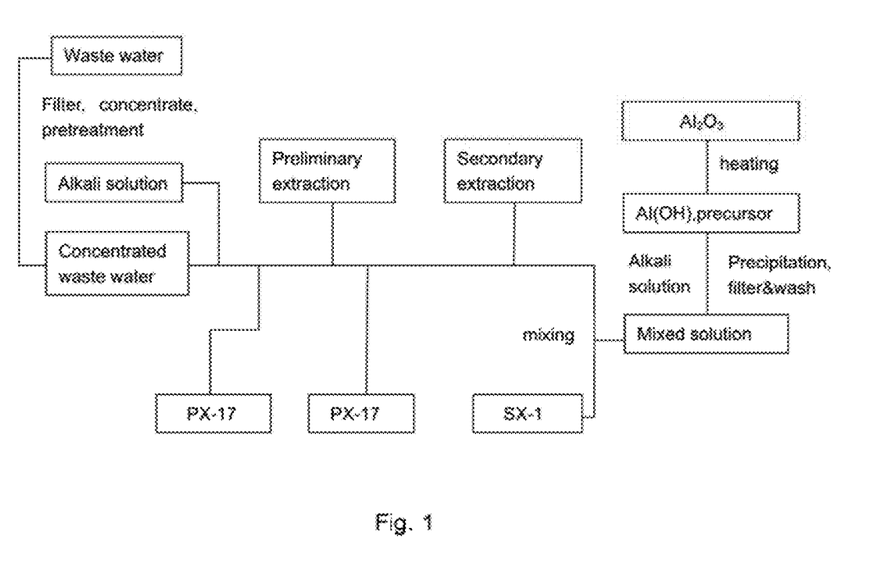
FIG. 1 is a flow chat of a novel method for extracting ultra high purity nano-alumina from wastewater of the invention.
Figure 4:
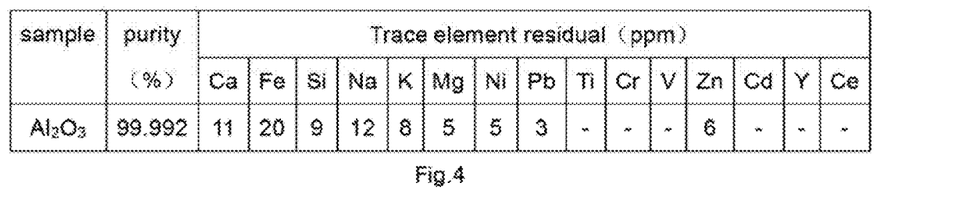
FIG. 4 is the trace elements residual analysis (ICP-OES) result for ultra high purity nano-alumina made by example 1 of the invention.

As shown in FIG. 1 and FIG. 4, the novel method for extracting ultra high purity nano-alumina from wastewater of the invention is as follows:

Step 1, filter the raw material waste containing aluminum ($Al^{3+}$) by Teflon mesh, and concentrate it to maintain aluminum ions ($Al^{3+}$) mass fraction of 5%; Then, the concentrated solution is dropped into the alkaline solution while the alkali mass fraction reaches 10%.

Step 2, add extraction agent PX-17 into mixed solution, during extraction process, keep pH value always at 3, maintain the temperature at 30° C.; add extraction agent PX-17 in the preliminary extraction for a secondary extraction, the initial dosage is 1.0 g/L, and stirring time is 0.5 h in the preliminary extraction; the second dosage is 1.2 g/L, and stirring time 0.5 h in the secondary extraction. Wherein the PX-17 component content is as follows: giant porous on exchange resins 18.5% macroporous zeolite molecular sieve 10.5%, activated carbon 5%, porous activated carbon fibers 28%, urea 14%, and porous alumina 24%.

Step 3, add the control agent SX-1 into extract solution, dosage is 0.3 g/L, at 30° C. and stir for 24 h; and add the alkali solution under the pH value as 2 to precipitate the aluminum hydroxide; then cooling, filtering and washing with ultra-pure water for 3~5 times, drying under 80° C. to obtain pure aluminum hydroxide precursor.

Step 4, heat the pure aluminum hydroxide precursor under 600° C. for 0.5 hours; then obtain the ultra high purity nano alumna by cooling down under 4° C.

Obtain the purity of 99.992% of ultra high purity nano alumina, and the particle size was 200 nm.

EXAMPLE 2

Figure 5:
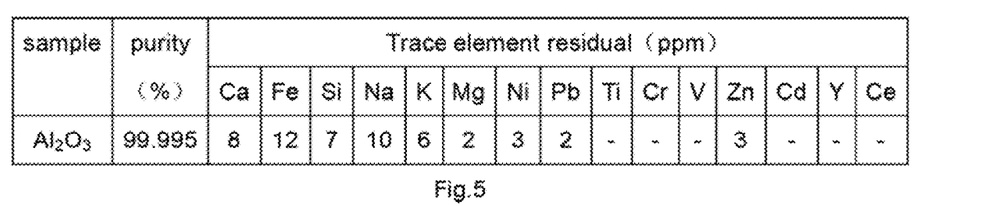
FIG. 5 is the trace elements residual analysis (ICP-OES) result ultra high purity nano-alumina made by example 2 of the invention.

As shown in FIG. 1 and FIG. 5, the novel method for extracting ultra high purity nano-alumina from wastewater of the invention is as follows:

Step 1, filter the raw material waste containing aluminum ($Al^{3+}$) by Teflon mesh, and concentrate it to maintain aluminum ions ($Al^{3+}$) mass fraction of 8%; Then, the concentrated solution, is dropped into the alkaline solution while the alkali mass fraction reaches 22%.

Step 2, add extraction agent PX-17 into mixed solution, during extraction process, keep pH value always at 5, maintain the temperature at 45° C.; add extraction agent PX-17 in the preliminary extraction for a secondary extraction, the initial dosage is 1.5 g/L, and stirring time is 1.5 h in the preliminary extraction; the second dosage is 2.4 g/L, and stirring time is 1.5 h in the secondary extraction. Wherein the PX-17 component content is as follows: giant porous ion exchange resins 18.5%, macroporous zeolite molecular sieve 11.5%, activated carbon 4.5%, porous activated carbon fibers 27%, urea 14.5%, and porous alumina 24%.

Step 3, add the control agent SX-1 into extract solution, dosage is 1.0 g/L, at 90° C. and stir for 18 h; and add the alkali solution under the pH value as 5 to precipitate the aluminum hydroxide; then cooling, filtering and washing with ultra-pure water for 3~5 times, drying under 90° C. to obtain pure aluminum hydroxide precursor.

Step 4, heat the pure aluminum hydroxide precursor under 750° C. for 1.5 hours; then obtain the ultra high purity nano alumina by cooling down under 2° C.

Obtain the purity of 99.995% of ultra high purity nano alumina, and the particle size was 180 nm.

EXAMPLE 3

Figure 6:
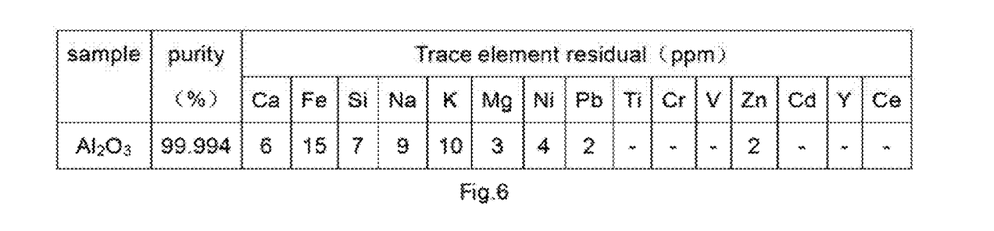
FIG. 6 is the trace elements residual analysis (ICP-OES) result for ultra high purity nano-alumina made by example 3 of the invention.

As shown in FIG. 1 and FIG. 6, the novel method for extracting ultra high purity nano-alumina from wastewater of the invention is as follows:

Step 1, filter the raw material waste containing aluminum ($Al^{3+}$) by Teflon mesh, and concentrate it to maintain aluminum ions ($Al^{3+}$) mass fraction of 11%; Then, the concentrated solution is dropped into the alkaline solution while the alkali mass fraction reaches 34%.

Step 2, add extraction agent PX-17 into mixed solution, during extraction process, keep pH value always at 7, maintain the temperature at 60° C.; add extraction agent PX-17 in the preliminary extraction for a secondary extraction, the initial, dosage is 1.0 g/L, and stirring time is 2.5 h in the preliminary extraction; the second dosage is 1.0 g/L, and stirring time is 2.5 h in the secondary extraction. Wherein the PX-17 component content is as follows: giant porous ion exchange resins 20%, macroporous zeolite molecular sieve 11%, activated carbon 4%, porous activated carbon fibers 26.6%, urea 14.4%, and porous alumina 24%.

Step 3, add the control agent SX-1 into extract solution, dosage is 1.5 g/L, at 158° C. and stir for 12 h; and add the alkali solution under the pH value as 7 to precipitate the aluminum hydroxide; then cooling, filtering and washing with ultra-pure water for 3~5 times, drying under 100° C. to obtain pure aluminum hydroxide precursor.

Step 4, heat the pure aluminum hydroxide precursor under 900° C. for 2 hours; then obtain the ultra high purity nano alumina by cooling down under 2° C.

Obtain the purity of 99.994% of ultra high purity nano alumina, and the particle size was 150 nm.

EXAMPLE 4

Figure 7:
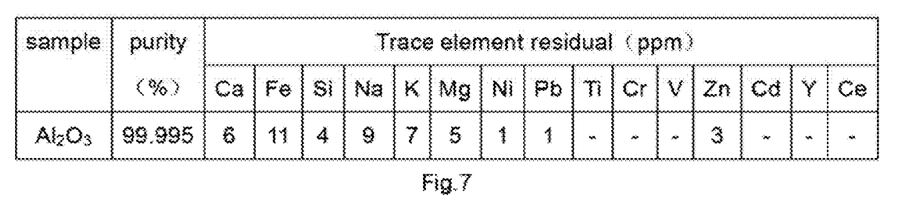
FIG. 7 is the trace elements residual analysis (ICP-OES) result for ultra high purity nano-alumina made by example 4 of the invention.

As shown in FIG. 1 and FIG. 7, the novel method for extracting ultra high purity nano-alumina from wastewater of the invention is as follows:

Step 1, filter the raw material waste containing aluminum ($Al^{3+}$) by Teflon mesh, and concentrate it to maintain aluminum ions ($Al^{3+}$) mass fraction of 14%; Then, the concentrated solution is dropped into the alkaline solution while the alkali mass fraction reaches 46%.

Step 2, add extraction agent PX-17 into mixed solution, during extraction process, keep pH value always at 8, maintain the temperature at 75° C.; add extraction agent PX-17 in the preliminary extraction for a secondary extraction, the initial dosage is 1.5 g/L, and stirring time is 3.5 h in the preliminary extraction; the second dosage is 4.5 g/L, and stirring time is 3.5 h in the secondary extraction. Wherein the PX-17 component content is as follows: giant porous ion exchange resins 18.5%, macroporous zeolite molecular sieve 10.7%, activated carbon 4.3%, porous activated carbon fibers 26.5%, urea 14%, and porous alumina 26%.

Step 3, add the control agent SX-1 into extract solution, dosage is 1.75 g/L, at 200° C. and stir for 6 h; continue add the alkali solution under the pH value as 8 to precipitate the aluminum hydroxide; then cooling, filtering and washing with ultra-pure water for 3~5 times, drying under 110° C. to obtain pure aluminum hydroxide precursor.

Step 4, heat the pure aluminum hydroxide precursor under 1000° C. for 3 hours; then obtain the ultra high purity nano alumina by cooling down under 0° C.

Obtain the purity of 99.995% of ultra high purity nano alumina, and the particle size was 130 nm.

EXAMPLE 5

As shown in FIG. 1 FIG. 2, FIG. 3 and FIG. 8, the novel method for extracting ultra high purity nano-alumina from wastewater of the invention is as follows:

Step 1, filter the raw material waste containing aluminum ($Al^{3+}$) by Teflon mesh, and concentrate it to maintain aluminum ions ($Al^{3+}$) mass fraction of 18%; Then, the concentrated solution is dropped into the ammonia solution while the alkali mass fraction reaches 60%.

Step 2, add extraction agent PX-17 into mixed solution, during extraction process, keep pH value always at 4, maintain the temperature at 90° C.; add extraction agent PX-17 in the preliminary extraction for a secondary extraction, the initial dosage is 2.0 g/L, and stirring time is 1 h in the preliminary extraction; the second dosage is 1.25 g/L, and stirring time is 1 h in the secondary extraction. Wherein the PX-17 component content is as follows: giant porous ion exchange resins 19.5%, macroporous zeolite molecular sieve 11%, activated carbon 4%, porous activated carbon fibers 27.5%, urea 14.8%, and porous alumina 23.2%.

Step 3, add the control agent SX-1 into extract solution, dosage is 1.8 g/L, at 280° C. and stir for 1 h; continue add the ammonia solution under the pH value as 8 to precipitate the aluminum hydroxide; then cooling, filtering and washing with ultra-pure water for 3~5 times, drying under 120° C. to obtain pure aluminum hydroxide precursor.

Step 4, heat the pure aluminum hydroxide precursor under 1200° C. for 2 hours; then obtain the ultra high purity nano alumina by cooling down under 0° C.

Figure 2:
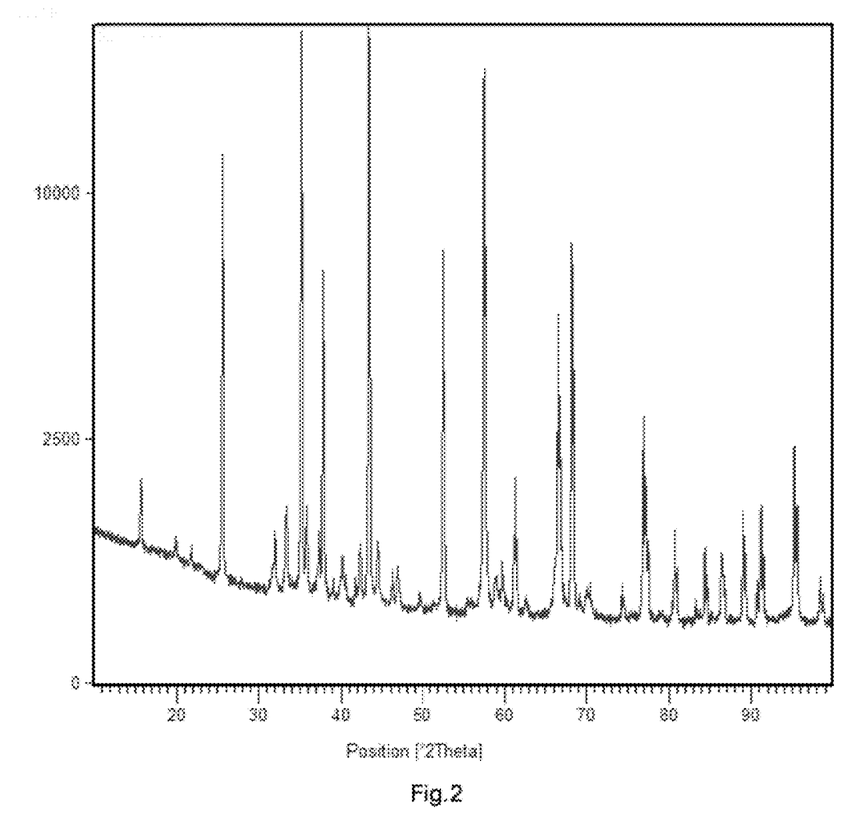
FIG. 2 is a X-ray Diffraction figure for ultra high purity nano-alumina made by example 5 of the invention.
Figure 3:
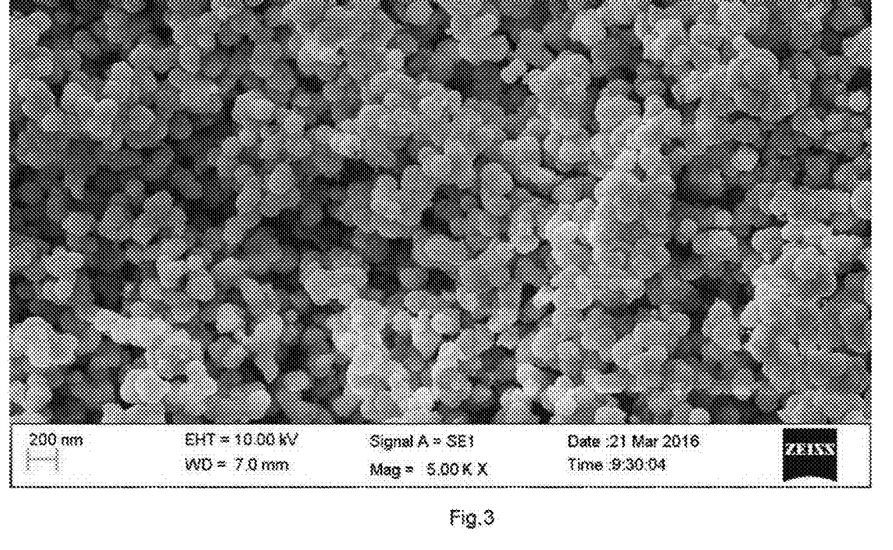
FIG. 3 is a field emission scanning electron microscopy (FESEM) figure for ultra high purity nano-alumina made by example 5 of the invention.
Figure 8:
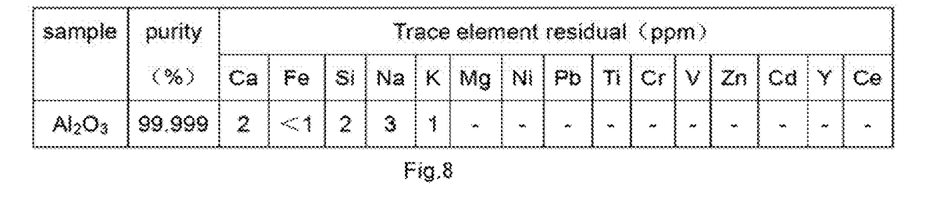
FIG. 8 is the trace elements residual analysis (ICP-OES) result for ultra high purity nano-alumina made by example 5 of the invention.

Obtain the purity of 99.999% of ultra high purity nano alumina, and the particle size was 100 nm.

We claim:

1. A method for extracting nano-alumina from wastewater, characterized in that comprising:
    (1) filtering wastewater containing $Al^{3+}$ with a mesh, and concentrating the filtered wastewater to maintain a $Al^{3+}$ mass fraction of 3% to 18%;
    dropping the concentrated wastewater into a first alkaline solution to obtain a mixture; wherein a mass fraction of alkali in the first alkaline solution reaches 10% to 60%;
    (2) adding an extraction agent into the mixture from step 1 and stirring the mixture to perform a preliminary extraction; during the preliminary extraction, keeping a pH value at 1-9; maintaining the temperature at 10° C. to 90° C.; adding the extraction agent again for a secondary extraction; wherein an initial dosage of the extraction agent for the preliminary extraction is 1 to 5 g/L, and a stirring time is 30 min to 5 h; a second dosage of the extraction agent for the secondary extraction is 0.1 to ~3 g/L, a stirring time is 0.5 to ~5 h;
    (3) adding a control agent into the extracted solution after the secondary extraction from step 2 and stirring; wherein a dosage of the control agent is 0.1 to ~5 g/L, stirring for 1 h to ~24 h at 20° C. to ~280° C.; and adding a second alkaline solution under a pH value of 1 to 10 to precipitate aluminum hydroxide; then cooling, filtering and washing the precipitated aluminum hydroxide with ultra-pure water for 3 to ~5 times, and drying the aluminum hydroxide under 80° C. to 120° C. to obtain an aluminum hydroxide precursor; and (4) heating the aluminum hydroxide precursor at 600° C. to 1200° C. for 0.5 to ~4 hours; then obtaining the nano alumina by cooling;
wherein the wastewater in step (1) contains a surface treatment waste liquid selected from the group comprising aluminum, aluminum plate, aluminum wire, aluminum foil, aluminum brick and aluminum alloy.

2. The method for extracting nano-alumina from wastewater according to claim 1, characterized in that the first alkaline solution in step (1) is selected from a group consisting of sodium hydroxide solution, potassium hydroxide solution, carbonate soda solution, potassium carbonate solution, calcium hydroxide solution and aqueous ammonia.

3. The method for extracting nano-alumina from wastewater according to claim 1, characterized in that the second alkaline solution in step (3) is selected form a group consisting of sodium hydroxide solution, potassium hydroxide solution, carbonate soda solution, potassium carbonate solution, calcium hydroxide solution and aqueous ammonia.

4. The method for extracting nano-alumina from wastewater according to claim 1 characterized in that the extraction agent in step (2) is selected from a group consisting of giant porous ion exchange resin, macroporous zeolite molecular sieve, activated carbon, porous carbon fiber, urea and porous alumina;
wherein, the extraction agent further consists of the following components by weight: giant porous ion exchange resins of 18.5% to 22%, macroporous zeolite molecular sieve of 10.5% to 14%, activated carbon of 3.5% to 7%, porous activated carbon fibers of 26.5% to 31%, urea of 14% to 17%, and porous alumina of 22.5% to 27%.

5. The method for extracting nano-alumina from wastewater according to claim 1, characterized in that the extraction agent in step (2) is selected from a group consisting of giant porous ion exchange resin, macroporous zeolite molecular sieve, activated carbon, porous carbon fiber, urea and porous alumina;
wherein the extraction agent further consists of the following components by weight: giant porous ion exchange resins of 19.0% to 20%, macroporous zeolite molecular sieve of 10.8% to 12.5%, activated carbon of 3.8% to 5.5%, porous activated carbon fibers of 27% to 28.5%, urea of 14.5% to 16%, and porous alumina of 23% to 24.5%.

6. The method for extracting nano-alumina from wastewater according to claim 1, characterized in that the extraction agent in step (2) is selected from a group consisting of giant porous ion exchange resin, macroporous zeolite molecular sieve, activated carbon, porous carbon fiber, urea, porous alumina;
wherein the extraction agent further consists of the following components by weight: giant porous ion exchange resins of 19.5%, macroporous zeolite molecular sieve of 11%, activated carbon of 4%, porous activated carbon fibers of 27.5%, urea of 14.8%, and porous alumina of 23.9%.

7. The method for extracting nano-alumina from wastewater according to claim 1, characterized in that the control agent in step (3) is selected from a group consisting of polyvinyl pyrrolidone, polyethylene glycol-2000, gelatin, polyoxyethylene polyoxypropylene copolymers, polysorbate surfactant, polyvinyl-124, and aluminum hydroxide.

8. The method for extracting nano-alumina from wastewater according to claim 1, characterized in that the nano-alumina in step (4) is taken out and passed through a cooling tunnel at a temperature of 0° C. to 4° C. for 15 min to 90 min.

9. The method for extracting nano-alumina from wastewater according to claim 1, characterized in that a purity of the nano-alumina is 99.992% to 99.999%.

10. An application of the method for extracting nano-alumina from wastewater according to claim 1, characterized in that the method is applied for the retrieving an acidic wastewater containing $Al^{3+}$.

* * * * *